(12) United States Patent
Arava

(10) Patent No.: US 8,908,861 B2
(45) Date of Patent: Dec. 9, 2014

(54) AES ALGORITHM-BASED ENCRYPTION APPARATUS AND METHOD FOR MOBILE COMMUNICATION SYSTEM

(75) Inventor: V. K. Prasad Arava, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 449 days.

(21) Appl. No.: 12/900,842

(22) Filed: Oct. 8, 2010

(65) Prior Publication Data

US 2011/0085660 A1    Apr. 14, 2011

(30) Foreign Application Priority Data

Oct. 9, 2009    (KR) .......................... 10-2009-0096257

(51) Int. Cl.
*H04L 9/00*    (2006.01)
*H04L 9/06*    (2006.01)

(52) U.S. Cl.
CPC ................................... *H04L 9/0681* (2013.01)
USPC .................. 380/44; 380/28; 380/29

(58) Field of Classification Search
None
See application file for complete search history.

(56) References Cited

U.S. PATENT DOCUMENTS

| | | | |
|---|---|---|---|
| 2005/0198531 A1* | 9/2005 | Kaniz et al. | 713/201 |
| 2006/0126847 A1* | 6/2006 | Ho | 380/277 |
| 2007/0192594 A1* | 8/2007 | Lee et al. | 713/163 |
| 2009/0307474 A1* | 12/2009 | Johnston | 713/2 |
| 2010/0239087 A1* | 9/2010 | Chaisson et al. | 380/44 |

* cited by examiner

*Primary Examiner* — Kaveh Abrishamkar
(74) *Attorney, Agent, or Firm* — The Farrell Law Firm, P.C.

(57) ABSTRACT

A method and apparatus for improving hardware flexibility for encrypting data based on the Advanced Encryption Standard (AES) block algorithm is provided. An encryption apparatus is equipped with a shared logic including a mode detector which detects a current AES mode performed by an AES block algorithm, a shared hardware for use in the detected AES mode, and a key controller which generates a key for performing encryption/decryption in the AES mode.

10 Claims, 8 Drawing Sheets

AES ALGORITHM-BASED ENCRYPTION APPARATUS AND METHOD FOR MOBILE COMMUNICATION SYSTEM

PRIORITY

This application claims priority under 35 U.S.C. §119(a) to a Korean Patent Application No. 10-2009-0096257, filed in the Korean Intellectual Property Office on Oct. 9, 2009, the disclosure of which is incorporated herein in its entirety by reference.

BACKGROUND OF THE INVENTION

1. Field of the Invention

The present invention relates generally to wireless communications and, in particular, to a method and apparatus for encrypting data based on the Advanced Encryption Standard (AES) block algorithm for processing multiple AES modes in a single hardware module.

2. Description of the Related Art

With the continuous increase of data traffic over the Internet and mobile communication networks, personal information security has become increasingly important. The Data Encryption Standard (DES) is a conventional encryption standard using 56-bit key, and has become vulnerable to sophisticated hacking attacks. Accordingly, the Advanced Encryption Standard (AES), which includes three block ciphers, AES-128, AES-192, and AES-256 having 128-bit block size with key sizes of 128, 192, and 256 bits, respectively, has been introduced.

The AES block algorithm has been adopted for the data encryption in mobile communication standards such as Long Term Evolution (LTE) and WiMax. Particularly, the AES block algorithm has several modes of operation including AES_CMAC (AES Cipher Based Message Authentication), AES_CTR (AES in CounTeR), and AES_CCM (AES Counter with Cipher block Change Message authentication) modes for encrypting/decrypting data. In order to encrypt and decrypt data with the AES block algorithm, the base station of the mobile communication system includes an AES engine.

The AES engine is provided with the hardware modules corresponding to the respective AES_CMAC, AES_CTR, and AES_CCM modes, which causes a lack of hardware usage flexibility. Also, the conventional AES block algorithm is implemented with hardware modules responsible for the respective processes and thus not programmable even though these processes can be performed in software. Accordingly, there is a need in the art to modify the hardware security module to have more flexibility for much higher security performance and develop a hardware module for improved AES block algorithm.

SUMMARY OF THE INVENTION

In order to solve the problems of the prior art, the present invention provides an apparatus and method for encrypting data using an AES block algorithm in a mobile communication system.

In accordance with an aspect of the present invention, an encryption apparatus equipped with a shared logic includes a mode detector which detects a current AES mode performed by an AES block algorithm, a shared hardware which is commonly used in the detected AES mode, and a key controller which generates a key for performing encryption/decryption in the AES mode.

In accordance with another aspect of the present invention, an encryption method based on an AES block algorithm includes checking an AES mode in which the AES block algorithm operates, performing the AES mode checked by a shared hardware which is commonly used in the AES mode, and generating a key for performing encryption/decryption in the AES mode.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF EMBODIMENTS OF THE INVENTION

Embodiments of the present invention are described in detail with reference to the accompanying drawings. The same reference numbers are used throughout the drawings to refer to the same or like parts. Detailed description of well-known functions and structures incorporated herein may be omitted for the sake of clarity and conciseness.

Figure 1:
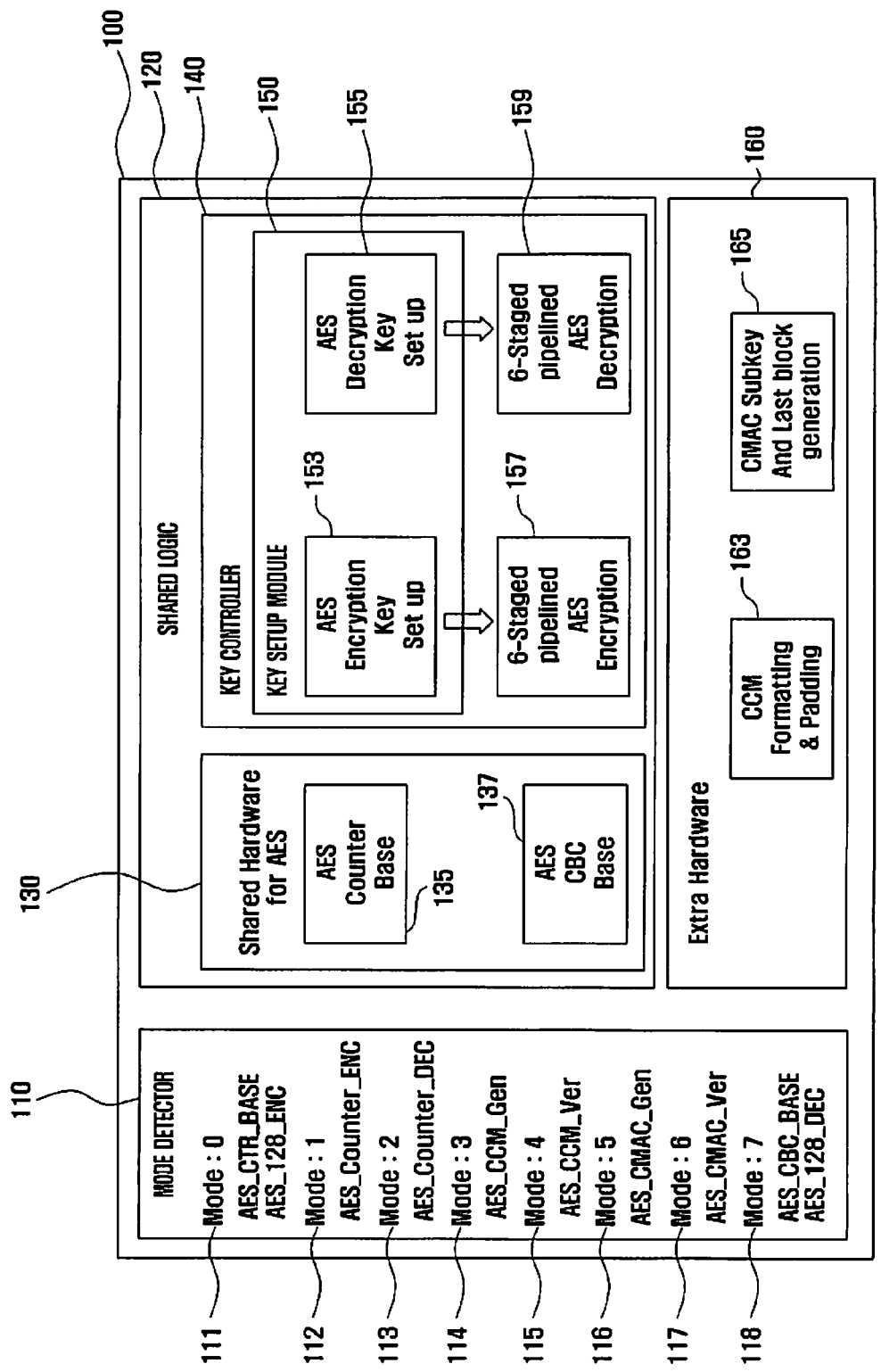
FIG. 1 illustrates a configuration of an encryption apparatus according to an embodiment of the present invention.

FIG. 1 illustrates a configuration of an encryption apparatus according to an embodiment of the present invention.

As shown in FIG. 1, the encryption apparatus 100 for performing the AES block algorithm includes a mode detector 110, a shared logic 120, and extra hardware 160. The shared logic 120 includes shared hardware 130 and a key controller 140. The shared hardware 130 includes an AES Counter Base block 135 and an AES CBC Base block 137. The key controller 140 includes key setup module 150, a 6-staged pipelined encryption module 157, and a 6-staged pipelined decryption module 159. The key setup module 150 includes an AES encryption key setup module 153 and an AES decryption key setup module 155.

The mode detector 110 is responsible for detecting the AES mode in which the AES block algorithm operates. If the AES block algorithm is in AES_CTR_BASE mode or AES_128_ENC mode to perform payload encryption in counter mode, the mode detector 110 regards the current mode as mode 0 as denoted by reference number 111. If the AES block algorithm is in AES_Counter_ENC mode, the mode detector 110 regards the current mode as mode 1 as denoted by reference number 112. If the AES block algorithm is in AES_Counter_DEC mode, the mode detector 110 regards the current mode as mode 2 as denoted by reference number 113.

If the AES block algorithm is in AES_CCM_Gen mode, the mode detector 110 regards the current mode as mode 3 as denoted by reference number 114. If the AES block algorithm is in AES_CCM_Ver mode, the mode detector 110 regards the current mode as mode 4 as denoted by reference number 115. If the AES block algorithm is in AES_CMAC_Gen mode, the mode detector 110 regards the current mode as mode 5 as denoted by reference number 116. If the AES block algorithm is in AES_CMAC_Ver mode, the mode detector 110 regards the current mode as mode 6 as denoted by reference number 117. Finally, if the AES block algorithm is in AES_CBC_BASE mode or AES__128_DEC mode, the mode detector 110 regards the current mode as mode 7 as denoted by reference number 118. The individual modes of operation are as follows:

The AES_CTR_BASE mode is a basic logic for performing the AES mode, and AES__128_ENC mode is for encrypting data in 128-bit block size with a 128-bit key.

The AES_Counter_ENC mode is for performing payload encryption in counter mode in which the counter increasing by 1 is encrypted to generate a key stream. The AES_Counter_DEC mode is for decrypting the cipher in counter mode.

The AES_CCM_Gen mode is for encrypting a payload and generating a tag. The AES_CCM_Ver mode is for decrypting the cipher and checking the tag. The AES_CMAC_Gen mode is for generating a Message Authentication Code (MAC) in the AES_CMAC mode, and the AES_CMAC_Ver mode is for checking the MAC in AES_CMAC mode. The AES_CBC_BASE mode is for activating the basic logic for performing the AES mode. The AES__128_DEC mode is for decrypting 128-bit block using a 128-bit key.

The AES_CCM mode including the AES_CCM_Gen and AES_CCM_Ver modes and the AES_CMAC mode including the AES_CMAC_Gen and AES_CMAC_Ver modes are performed for data management. The AES_CTR mode including the AES_Counter_ENC and the AES_Counter_DEC modes is performed for data transmission.

The shared logic 120 is responsible for performing the AES mode detected by the mode detector 110. In order to check the AES mode, the shared logic 120 includes shared hardware 130 for performing the AES block algorithm to operate the detected AES mode and the key controller 140 for controlling keys to perform the AES block algorithm. The key controller 140 includes the key setup module 150 for setting up the key. The shared logic 120 can activate a part of the shared hardware that is needed in the detected AES mode.

The shared hardware 130 includes the AES Counter Base block 135 and the AES CBC Base block 137. The operations of the AES Counter Base block 135 and the AES CBC block 137 will be described with reference to FIGS. 2 and 3, respectively.

Figure 2:
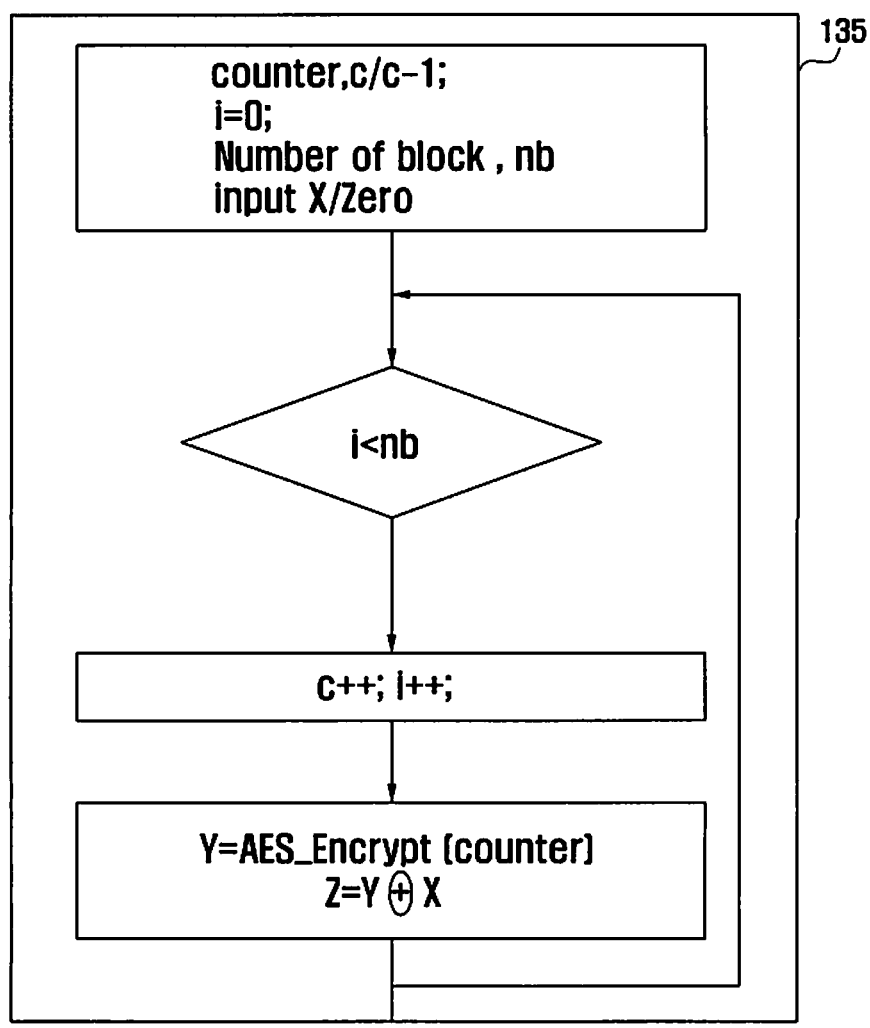
FIG. 2 is a flowchart illustrating a process performed by the AES Counter Base block of the encryption apparatus of FIG. 1.

FIG. 2 is a flowchart illustrating a process performed by the AES Counter Base block of the encryption apparatus of FIG. 1.

The AES Counter Base block 135 of the shared hardware 130 is implemented in the form of an algorithm as shown in FIG. 2. The AES Counter Base block 135 is a part of the AES block algorithm for performing the counter mode, and is commonly used when the modes 0 to 7 are detected by the mode detector 110.

Figure 3:
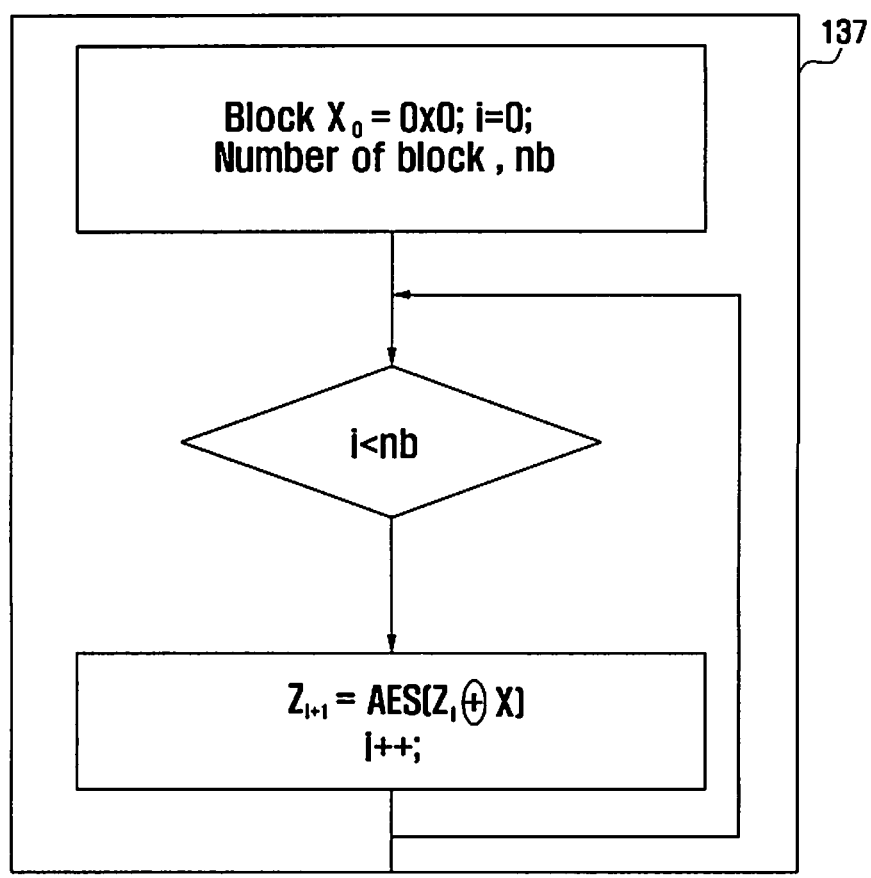
FIG. 3 is a flowchart illustrating a process performed by the AES Cipher Block Changing (CBC) Base block 137 of the encryption apparatus of FIG. 1.

FIG. 3 is a flowchart illustrating a process performed by the AES CBC Base block 137 of the encryption apparatus of FIG. 1.

The AES CBC Base block 137 of the shared hardware 130 is implemented in the form of an algorithm as shown in FIG. 3. The AES CBC Base block 137 is a part of the AES block algorithm for performing the CBC mode. The AES CBC Base block 137 is commonly used when the modes 3 to 6 are detected by the mode detector 110.

Since the AES Counter Base block 135 and the AES CBC Base block 137 are parts of the AES block algorithm, detailed descriptions thereon are omitted here.

Referring back to FIG. 1, the shared logic 120 is capable of performing individual AES modes checked by the mode detector 110 through the AES Counter Base block 135 and the AES CBC Base block 137 of the shared hardware 130. Assuming that the current AES mode is the AES_Counter mode, the shared logic 120 performs the AES_Counter mode, AES_CCM mode, and AES_CMAC mode by means of the AES Counter Base block 135 of the shared hardware 130.

If the current AES mode is the AES_CCM mode or the AES_CMAC mode, the shared logic 120 performs the AES_CCM mode or the AES_CMAC mode by means of the AES Counter Base block 135 and the AES CBC Base block 137 of the shared hardware 130.

The key controller 140 is responsible for setting up the key required for performing encryption/decryption in AES mode. The key controller 140 encrypts/decrypts the blocks generated with the key in the AES mode. For this purpose, the key controller 140 includes the key setup module 150.

The key setup module 150 is responsible for setting up the key for encrypting/decrypting data in AES mode. The key setup module 150 includes the AES Encryption Key Setup module 153 and the AES Decryption Key Setup module 155.

The AES Encryption Key Setup module 153 is responsible for generating a key for continuously encrypting data in units of blocks according to the AES block algorithm. The AES Decryption Key Setup module 155 is responsible for generating the key for decrypting the encrypted data according to the AES block algorithm.

The key controller 140 includes the 6-staged pipelined encryption module 157 and the 6-staged pipelined decryption module 159.

The 6-staged pipelined encryption module 157 generates a block encrypted with the key generated by the AES Encryption Key Setup module 153. The 6-staged pipelined decryption module 159 decrypts the block using the key generated by the AES Decryption Key Setup module 155. The operations of the 6-staged pipelined encryption module 157 and a 6-staged pipelined decryption module 159 will be described later with reference to FIGS. 4 and 5.

The extra hardware 160 includes a CCM formatting and padding module 163 for performing CCM formatting and padding in the AES_CCM mode and a CMAC sub-key and last block generation module 165 for generating a CMAC sub-key and the last block in the AES_CMAC mode.

The shared logic 120 operates for performing the AES mode in the above structured encryption apparatus 100 as follows:

If the AES mode is the Counter mode, the base station regards the AES mode as mode 1 or mode 2. In this case, the base station activates the AES Counter Base block 135 and the key setup module 150 to perform the Counter mode.

If the AES mode is the CMAC mode, the base station regards the current AES mode as mode 5 or mode 6. In this case, the base station generates a CMAC sub-key by means of the extra hardware 160. The base station activates the AES Counter Base block 135 and the AES CBC base block 137 of the shared hardware 130 and the key setup module 150 to perform the CMAC mode.

If the AES mode is the CCM mode, the base station regards the current AES mode as mode 3 or mode 4. In this case, the base station performs CCM formatting and padding by means of the extra hardware 160. The base station activates the AES Counter Base block 135 and the AES CBC Base block 137 of the shared hardware 130 and the key setup module 150 to perform the CCM mode.

Prior to describing, with reference to FIGS. 4 and 5, the operations of the 6-staged pipelined AES encryption module 157 and the 6-staged pipelined AES decryption module 159, the pipeline scheme will now be described.

The pipeline scheme is a method for multiple sub-processors to simultaneously process different data in parallel. Pipelines can be classified into a command pipeline and an operation pipeline. In the command pipeline scheme, the commands move through the processor, and in the operation so pipeline scheme, arithmetic operations are performed in an overlapping manner.

The 6-staged pipelined AES encryption module 157 and the 6-staged pipelined AES decryption module 159, which pipelines include six stages, share the keys generated by the AES encryption key setup module 153 and the AES decryption key setup module 155 at six stages to encrypt/decrypt the data.

Figure 4:
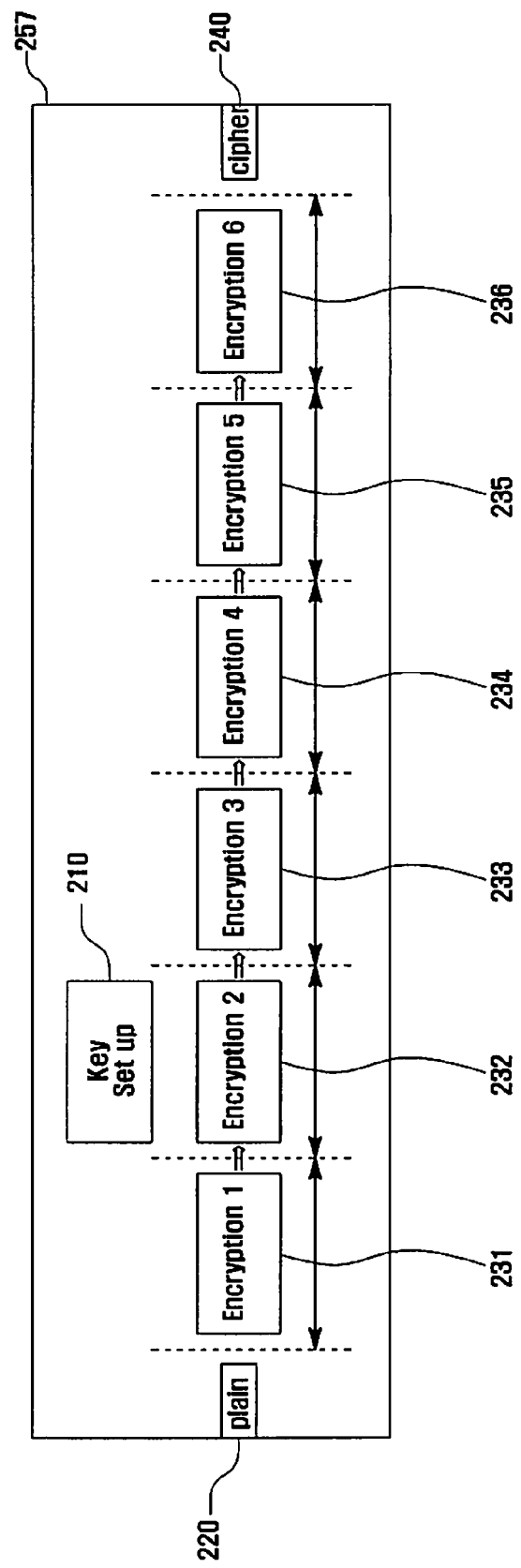
FIG. 4 illustrates a configuration of the 6-staged pipelined AES encryption module of the encryption apparatus of FIG. 1.

FIG. 4 illustrates a configuration of the 6-staged pipelined AES encryption module of the encryption apparatus of FIG. 1.

Referring to FIG. 4, the 6-staged pipelined encryption module 157 encrypts a plain text 220 using the key 210 set by the AES encryption key setup module 153. The 6-staged pipelined AES encryption module 157 uses the 6-staged pipeline scheme. That is, the 6-staged pipelined AES encryption module 157 repeatedly uses the key 210 at encryption 1 stage 231, encryption 2 stage 232, encryption 3 stage 233, encryption 4 stage 234, encryption 5 stage 235, and encryption 6 stage 236. At each encryption stage, the plain text 220 is encrypted into a cipher text 240 with the key.

Figure 5:
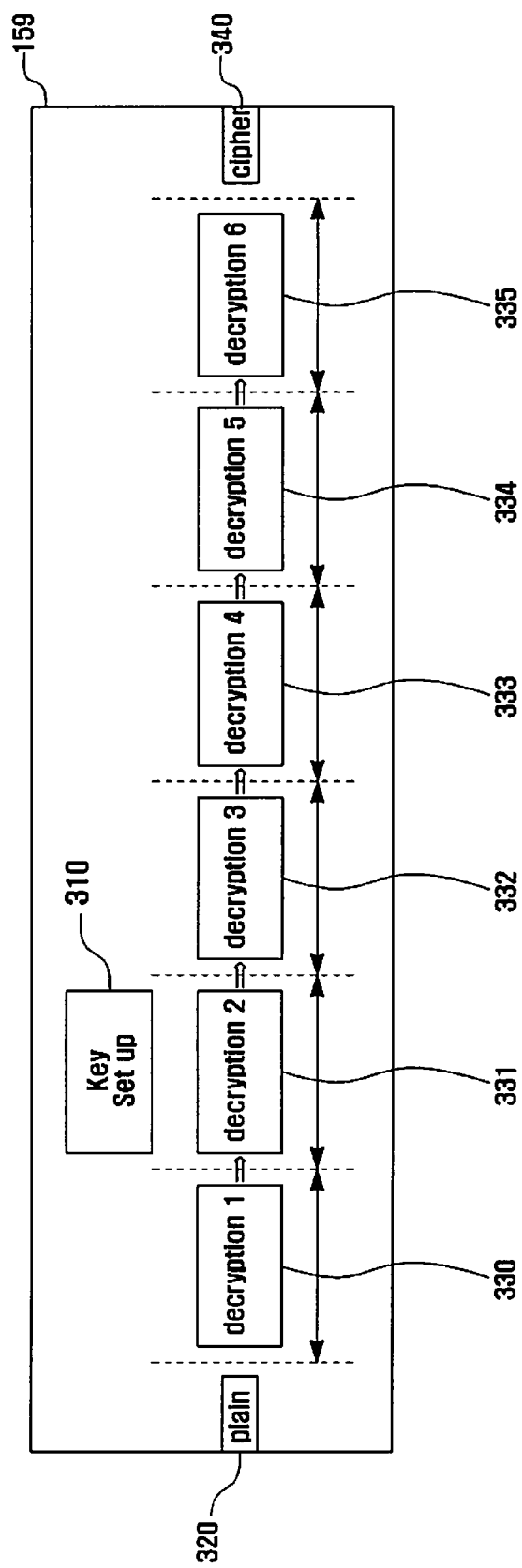
FIG. 5 illustrates a configuration of the 6-staged pipelined AES decryption module of the encryption apparatus of FIG. 1.

FIG. 5 illustrates a configuration of the 6-staged pipelined AES decryption module of the encryption apparatus of FIG. 1.

Referring to FIG. 5, the 6-staged pipelined AES decryption module 159 decrypts a cipher text 320 with the key 310 set by the AES decryption key setup module 155. The 6-staged pipelined AES decryption module 159 uses the 6-staged pipeline scheme. That is, the 6-staged pipelined AES decryption module 159 repeatedly uses the key 310 at decryption 1 stage 330, decryption 2 stage 331, decryption 3 stage 332, decryption 4 stage 333, decryption 5 stage 334, and decryption 6 stage 335. At each decryption state, the plain text 320 is decrypted into a cipher text 340.

In the above structure encryption apparatus 100, the hardware used in individual AES modes is implemented with the single shared logic 120. The key 310 is repeatedly used at individual decryption stages in the 6-staged pipelined AES encryption and decryption modules 157 and 159 through the pipeline scheme.

A description will now be made of the encryption method using the AES block algorithm in the encryption apparatus with reference to FIGS. 6 to 9. Although the description is directed to the encryption device 100 implemented in a base station, the encryption device can be applied to any of the terminals that encrypt data using the AES block algorithm.

Figure 6:
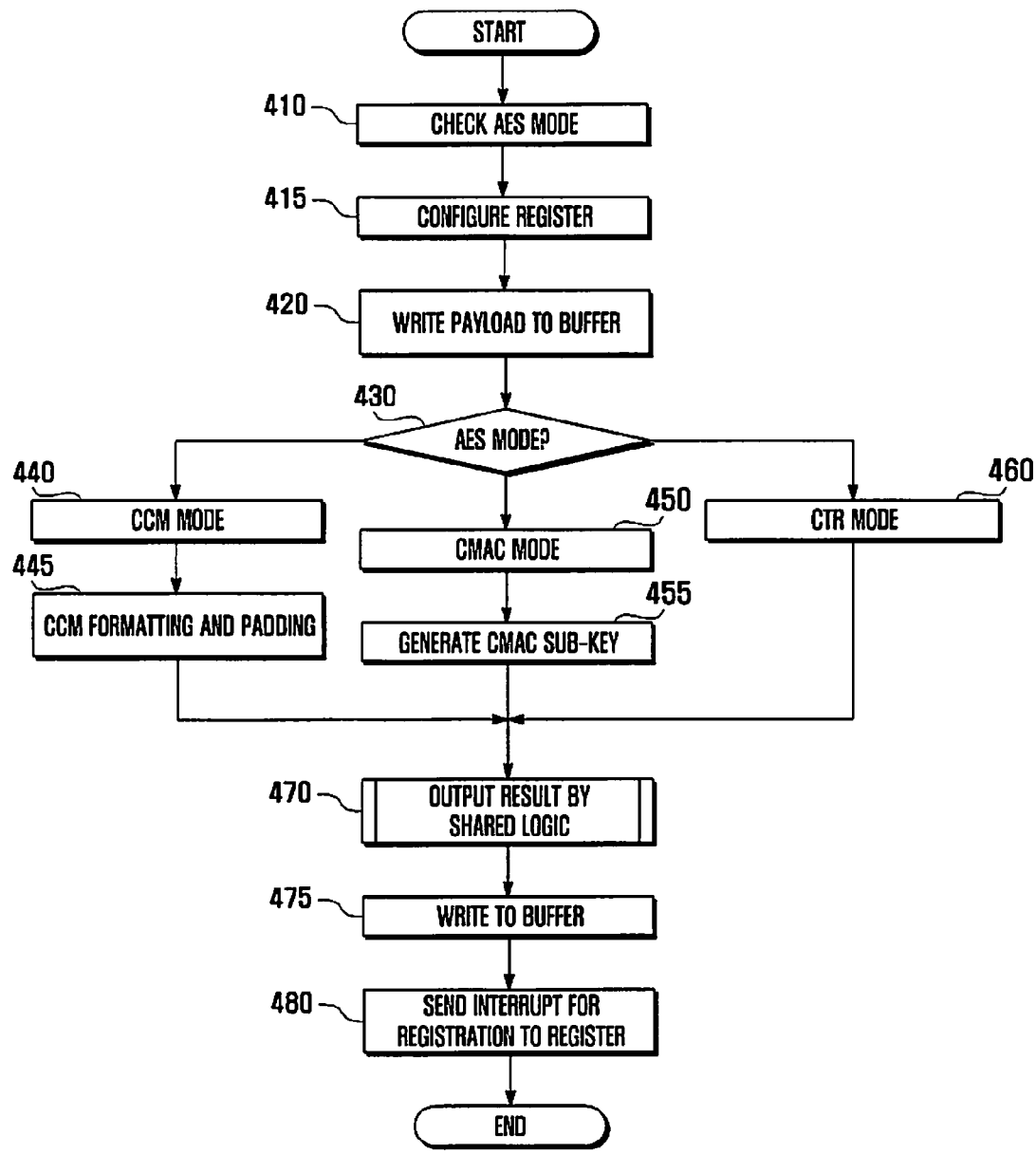
FIG. 6 is a flowchart illustrating an encryption method according to an embodiment of the present invention.

FIG. 6 is a flowchart illustrating an encryption method according to an embodiment of the present invention.

Referring to FIG. 6, the base station first checks the AES mode to be performed with the AES block algorithm in step 410. That is, the base station determines which is the current ABS mode among the preset modes 0 to 7. Mode 0 corresponds to the AES_CTR_BASE mode and AES__128_ENC mode, mode 1 corresponds to the AES_Counter_ENC mode, mode 2 corresponds to the AES_Counter_DEC mode, mode 3 corresponds to the AES_CCM_Gen mode, mode 4 corresponds to the AES_CCM_Ver mode, mode 5 corresponds to the AES_CMAC_Gen mode, mode 6 corresponds to the AES_CMAC_Ver mode, and mode 7 corresponds to the AES_CBC_BASE mode and ABS__128_DEC mode.

The AES modes are performed as follows:

The AES_CTR_BASE mode is a basic logic for performing the AES mode, and the AES__128_ENC mode is for encrypting data to a 128-bit block using a 128-bit key.

The AES_Counter_ENC mode is for encrypting a payload in Counter mode in which the counter increasing by 1 is encrypted to generate a key stream. The AES_Counter_DEC mode is for decrypting the cipher in counter mode.

The AES_CCM_Gen mode is for encrypting a payload and generation a tag. The AES_CCM_Ver mode is for decrypting the cipher and checking the tag. The AES_CMAC_Gen mode is for generating a Message Authentication Code (MAC) in AES_CMAC mode, and the AES_CMAC_Ver mode is for checking the MAC in AES_CMAC mode. The AES_CBC_BASE mode is for activating the basic logic for performing the AES mode. The AES__128_DEC mode is for decrypting a 128-bit block using a 128-bit key.

The AES_CCM mode including the AES_CCM_Gen and AES_CCM_Ver modes and the AES_CMAC mode including the AES_CMAC_Gen and AES_CMAC_Ver modes are performed for data management. The AES_CTR mode including the AES_Counter_ENC and AES_Counter_DEC modes is performed for data transmission.

The base station configures a register for performing the detected AES mode in step 415, and sends the payload for writing the result output through the AES block algorithm to a buffer in step 420.

The base station determines whether the AES mode is the CCM mode, the CMAC mode, or the CTR mode in step 430. If the AES mode is the CCM mode, the base station determines the AES mode as the AES_CCM mode corresponding to mode 3 or mode 4 in step 440 and controls the extra hardware 160 to perform CCM formatting and padding in step 445, and the process advances to step 470.

If the AES mode is the CMAC mode, the base station determines the AES mode as the AES_CMAC mode corresponding to mode 5 or mode 6 in step 450 and controls the extra hardware 160 to generate a CMAC sub-key in step 455, and the process advances to step 470.

If the AES mode is the CTR mode, the base station determines the AES mode as the AES_CTR mode corresponding to mode 0, mode 1, or mode 2 in step 460, and the process advances to step 470.

At step 470, the base station outputs the result value of the shared logic 120 of the encryption apparatus 100 in the determined AES mode. Prior to a description of steps 475 and 480, a description of FIGS. 7 and 8 will now be given.

Figure 7:
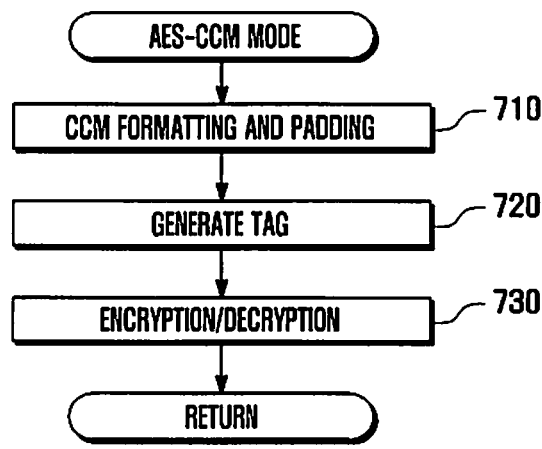
FIG. 7 is a flowchart illustrating a process for performing AES_CCM mode in the encryption method of FIG. 6.

FIG. 7 is a flowchart illustrating a process for performing AES_CCM mode in the encryption method of FIG. 6.

Referring to FIG. 7, in the AES_CCM mode, the base station performs CCM formatting and padding by means of the extra hardware 160 in step 710. The base station then generates a tag by means of the ABS Counter module 135 and the AES CBC Base module 137 of the shared logic 120 in step 720. The base station encrypts or decrypts data by means of the key controller 140 of the shared logic 120 in step 730.

Figure 8:
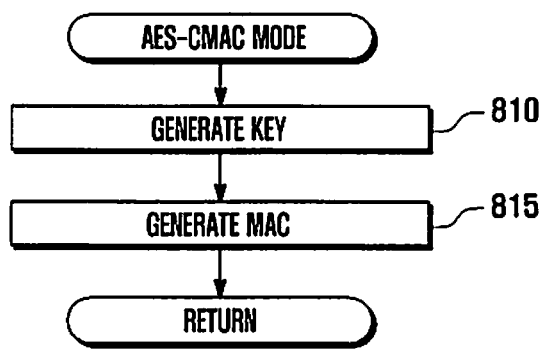
FIG. 8 is a flowchart illustrating a process for performing AES_CMAC mode in the encryption method of FIG. 6.

FIG. 8 is a flowchart illustrating a process for performing AES_CMAC mode in the encryption method of FIG. 6.

Referring to FIG. 8, in the AES_CMAC mode, the base station generates the CMAC sub-key by means of the extra hardware 160 in step 810. The base station then generates a MAC by means of the AES Counter Base module 135 and AES CBC Base module 137 of the shared logic 120 in step 815.

Figure 9:
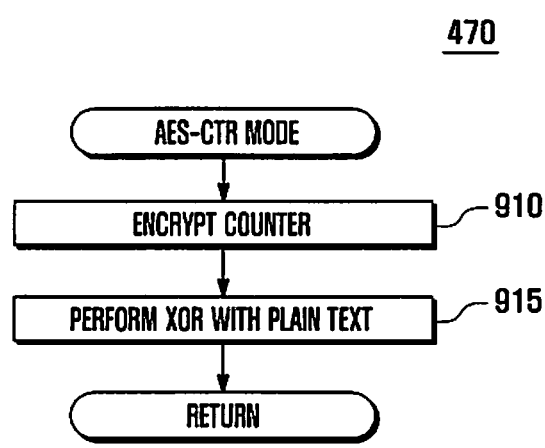
FIG. 9 is a flowchart illustrating a process for performing AES_CTR mode in the encryption method of FIG. 6.

FIG. 9 is a flowchart illustrating a process for performing AES_CTR mode in the encryption method of FIG. 6.

Referring to FIG. 9, in the AES_CTR mode, the base station encrypts the counter by means of the AES Counter Base module 135 of the shared logic 120 in step 910. The base station then performs exclusive or operation (Xor) on the encrypted counter with a plain text in step 915.

Returning to FIG. 6, once the result value of the determined AES mode is output as described with reference to FIGS. 7 to 9, the base station writes the result value to the buffer in step 475, and then sends an interrupt for registration in step 480.

According to the present invention, the hardware modules needed for the respective AES modes in the encryption/decryption procedure using the AES block algorithm are shared, which improves hardware flexibility. Also, the encryption method of the present invention implements the AES block algorithm in software rather than hardware.

Although embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An encryption apparatus for use in a base station, the encryption apparatus comprising:
    a mode detector for detecting, in the base station, an advanced encryption standard (AES) mode performed by an AES block algorithm;
    a non-shared extra function for performing a first data processing;
    a shared function for performing a second data processing, the second data processing comprising performing the AES block algorithm to operate the detected AES mode; and
    a controller for performing, if the detected AES mode is an AES counter with cipher block change message authentication (CCM) mode or the detected AES mode is an AES cipher based message authentication (CMAC) mode, encryption using the non-shared extra function and the shared function, and performing, if the detected AES modes is an AES in counter (CTR) mode, encryption using the shared function.

2. The encryption apparatus of claim 1, further comprising a key controller for generating a key for performing encryption/decryption in the AES mode, the key controller comprising:
    a key setup module for setting up the key:
    an AES encryption module for performing encryption with the key in a pipeline scheme; and
    an AES decryption module for performing decryption with the key in the pipeline scheme.

3. The encryption apparatus of claim 1, wherein the shared function comprises:
    an AES Counter Base block for use in the AES block algorithm if the detected AES mode is a counter mode; and
    an AES cipher block changing (CBC) Base block for use in the AES block algorithm if the detected AES mode is a CBC mode.

4. The encryption apparatus of claim 1, wherein the non-shared extra function comprises:
    a counter with a CCM formatting module for performing, if the detected AES mode is the AES CCM mode, a CCM format; and
    a padding module for padding the data.

5. The encryption apparatus of claim 1, wherein the non-shared extra function comprises:
    a sub-key generator for generating, if the detected AES mode is the AES CMAC mode, a CMAC sub-key.

6. An encryption method based on an advanced encryption standard (AES) block algorithm, the encryption method for use in an encryption apparatus in a base station and comprising:
    detecting, by a mode detector, an AES mode in which the AES block algorithm operates;
    performing, if the detected AES mode is an AES counter with cipher block change message authentication (CCM) mode or the detected AES mode is an AES cipher based message authentication (CMAC) mode, encryption using a non-shared extra function and a shared function: and
    performing, if the detected AES mode is an AES in counter (CTR) mode, encryption using the shared function.

7. The encryption method of claim 6, further comprising generating, by a key controller, a key for performing encryption/decryption in the AES mode, wherein generating the key comprises:
    setting up the key; and
    performing encryption/decryption with the key in a pipeline scheme.

8. The encryption method of claim 6, wherein the AES mode performed by an AES Counter Base block which is a part of the AES block algorithm operating in a counter mode and an AES cipher block changing (CBC) Base block which is a part of the AES block algorithm operating in a CBC mode.

9. The encryption method of claim 6, wherein processing data comprises:
    performing, if the detected AES mode is an AES counter with the AES CCM mode, a CCM format; and
    padding the data.

10. The encryption method of claim 6, wherein processing data comprises:
    generating, if the detected AES mode is the AES CMAC mode, a CMAC sub-key.

* * * * *